(12) United States Patent
Agrawal et al.

(10) Patent No.: US 12,056,263 B2
(45) Date of Patent: Aug. 6, 2024

(54) DATA STORAGE DEVICE AND METHOD OF ACCESS

(71) Applicant: Western Digital Technologies, Inc., San Jose, CA (US)

(72) Inventors: Raghav Agrawal, Bengaluru (IN); Shashwat Jain, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 248 days.

(21) Appl. No.: 17/228,715

(22) Filed: Apr. 13, 2021

(65) Prior Publication Data

US 2022/0327245 A1    Oct. 13, 2022

(51) Int. Cl.
*G06F 21/78*    (2013.01)
*G06F 21/31*    (2013.01)
*G06F 21/60*    (2013.01)

(52) U.S. Cl.
CPC .............. *G06F 21/78* (2013.01); *G06F 21/31* (2013.01); *G06F 21/604* (2013.01); *G06F 2221/2113* (2013.01)

(58) Field of Classification Search
CPC ........ G06F 21/78; G06F 21/31; G06F 21/604; G06F 2221/6218; G06F 21/6218
See application file for complete search history.

(56) References Cited

U.S. PATENT DOCUMENTS

| 8,799,221 | B2 | 8/2014 | Canessa et al. | |
|---|---|---|---|---|
| 9,069,879 | B2 | 6/2015 | Hunter | |
| 2013/0305039 | A1* | 11/2013 | Gauda | G06F 21/6272 713/153 |
| 2014/0188790 | A1* | 7/2014 | Hunter | H04L 63/08 707/610 |
| 2014/0317371 | A1* | 10/2014 | Muhlestein | G06F 16/13 711/163 |
| 2016/0065587 | A1* | 3/2016 | Hesselink | G06F 21/62 726/1 |
| 2016/0078244 | A1* | 3/2016 | Bruso | G06F 21/6218 713/189 |

* cited by examiner

*Primary Examiner* — Ellen Tran
(74) *Attorney, Agent, or Firm* — Patent Law Works LLP

(57) ABSTRACT

A data storage device and method to selectively enable access to stored user data files. The method includes receiving authentication credential from a user and, in response, retrieving a unique user identifier associated with the authentication credential. The stored user data files on the data storage device each has respective data file identifier. The method includes, for each user, enumerating a directory of stored data files where the data file identifier matches the unique user identifier of that user. This enables selective access of files corresponding the user. Multiple users can be registered to the same data storage device and selective access prevents one user from accessing another user's data files.

20 Claims, 14 Drawing Sheets

DATA STORAGE DEVICE AND METHOD OF ACCESS

TECHNICAL FIELD

This disclosure relates to a data storage device and method of accessing a data storage device. This includes enabling access to the data storage device for specified users.

BACKGROUND

The security of user data can be enabled by restricting physical access to a data storage device. In further examples, password-based authentication can be used to thwart access to user data for an unwelcomed actor who gains access to the data storage device.

In some situations, a data storage device is shared with multiple users. A data storage device, shared amongst a group of peers, may have some files intended to be accessed to a particular user. A problem with known examples of data storage devices shared with multiple users is that anyone with access to the password could have access to all the data on the data storage device.

A data storage device can be split into multiple partitions, whereby different access privileges can be assigned for each partition. To maximize use of available free space, this may require resizing of the partitions based on usage. Another approach can include assigning and managing access privileges to user data of a data storage device by an operating system of a host computer. However, this can be problematic with a data storage device that is shared since different users may choose to use different host devices with different access privileges. Furthermore, different host devices may in turn use different operating systems.

SUMMARY

Aspects of the present disclosure seek to facilitate a data storage device that can be used by multiple users. This includes selectively enabling access to user data files that correspond to a user whilst preventing access to those files for other users or other actors.

Disclosed herein is a computer-implemented method for selectively enabling access to stored user data files, the computer-implemented method comprising: receiving an authentication credential from a host device, wherein the authentication credential is associated with a user of a data storage device; and retrieving a unique user identifier that is associated with the authentication credential. The method also includes enumerating a directory of stored user data files that are associated with the user, wherein each of the stored user data files is associated with a respective data file identifier. Enumerating the directory comprises: comparing the unique user identifier to the data file identifiers of the stored user data files, and including a reference in the directory to stored user data files for which the unique user identifier and the data file identifier are matched. The method also includes providing the directory to the host device.

In some embodiments, the method includes a user registration mode wherein the method comprises: receiving a user creation request including the authentication credential of the user; generating the unique user identifier associated with the authentication credential; storing, in a user lookup table in a storage medium of the data storage device, the unique user identifier with the associated authentication credential.

In some embodiments of the method, responsive to retrieving the unique user identifier that is associated with the authentication credential, the method further comprises sending the unique user identifier to a host driver instance.

In some embodiments of the method, the step of enumerating the directory is performed, at least in part, by the host driver instance at the host device.

In some embodiments, the method further comprises: receiving, from the host device, a request to write a new user data file to be stored in the data storage device; adding, by the data storage device, the unique user identifier to a data file identifier associated with the new user data file; and writing the new user data file and data file identifier associated with the new user data file to a storage medium of the data storage device.

In some embodiments of the method, the authentication credential comprises a username and a password, and wherein the step of retrieving a unique user identifier that is associated with the authentication credential comprises: querying a user lookup table in a storage medium of the data storage device for a unique user identifier associated with the username and password.

In some embodiments, the method further comprises: verifying the username and password matches records in the user lookup table or other record in the storage medium of the data storage device, wherein the step of enumerating the directory is in response to verifying the username and password matches records in the user lookup table or other record in the storage medium of the data storage device.

In some embodiments, the method further comprises: receiving, from the host device, a request to read one or more of the stored user data files for which the unique user identifier and the data file identifier are matched; and responsive to receiving the request to read one or more of the stored user data files and verifying the username and password, sending the one or more stored user data files associated with the request to the host device.

In some embodiments, the method further comprises: receiving, from the host device, a request to remove a user associated with the data storage device. Responsive to receiving the request to remove a user and verifying the user name and password, the method further comprises: deleting stored user data files for which respective data file identifier match the unique user identifier; and deleting the unique user identifier, username and password associated with the user from the user lookup table in the storage medium.

In some embodiments, the method further comprises: updating an authentication status based on results of querying the user lookup table for a unique user identifier and/or verifying the username and password; and sending the authentication status to a host driver instance at the host device.

In some embodiments of the method, enumerating the directory further comprises: receiving, from a storage medium of the data storage device, the data file identifiers of the stored user data files; and filtering, at the data storage device, the data file identifiers of the stored user data files to select data file identifiers associated with the unique user identifier, and sending the data files identifiers associated with the unique user identifier to the host device.

In some embodiments, the method further comprises: receiving, from the host device, a request to write a new user data file to be stored in the data storage device; adding, by the host driver instance, the unique user identifier to a data file identifier associated with the new user data file; and writing the new user data file and data file identifier associated with the new user data file to a storage medium of the data storage device.

Disclosed herein is a data storage device comprising: at least one storage medium and at least one controller. The at least one storage medium is configured to: store a user lookup table, the user lookup table including, for each user, authentication credentials and an associated unique user identifier; and store user data files, wherein each user data file is associated with a respective data file identifier, and wherein the data file identifier is matched with at least one unique user identifier in the user lookup table. The at least one controller is configured to: receive an authentication credential of a user from a host device; retrieve from the user lookup table a unique user identifier associated with the received authentication credential of the user; and responsive to receiving the authentication credential of the user from the host device, send the unique user identifier associated with the authentication credential of the user to the host device.

In some embodiments, the data storage device has a registration mode. The at least one controller is further configured to: receive a user creation request including the authentication credential of the user; generate the unique user identifier associated with the authentication credential; and store, in the user lookup table, the unique user identifier with the associated authentication credential.

In some embodiments of the data storage device, responsive to retrieving from the user lookup table the unique user identifier associated with the received authentication credential, the data storage device is configured to: send, to the host device, the data file identifiers of the user data files.

In some embodiments of the data storage device, responsive to retrieving from the user lookup table the unique user identifier associated with the received authentication credential, the data storage device is configured to: send, to the host device, the data file identifiers of the user data files that are matched with the unique user identifier.

In some embodiments, the data storage device is further configured to: receive, from the host device, a request to write a new user file to be stored in the data storage device; and writing the new user file and data file identifier associated with the new user file to the storage medium, wherein the data file identifier associated with the new user file includes the unique user identifier of the user.

In some embodiments, the data storage device is further configured to: receive, from the host device, a request to read one or more stored user data files. Responsive to receiving the request to read one or more of the stored user data files, the data storage device is further configured to: compare the unique user identifier of the user with the respective data file identifiers of the one or more stored user data files associated with the request; and send the one or more stored user data files associated with the request to the host device for which the respective data file identifiers are matched with the unique user identifier of the user.

In some embodiments, the data storage device is further configured to: receive, from the host device, a request to remove a user associated with the data storage device, wherein the request is accompanied with the authentication credential of the user; verifying the authentication credential matches records in the user lookup table, including querying the authentication credential is associated with a respective unique user identifier. Responsive to receiving the request to remove a user and verifying the authentication credential matches records, the data storage device is further configured to: delete stored user data files for which the respective data file identifier match the unique user identifier; and delete the unique user identifier and the authentication credential associated with the user from the user lookup table in the storage medium.

Disclosed herein is a non-transitory computer-readable storage medium that has computer-readable program code stored therein that, when executed by a processor, causes a computer system to at least: instantiate a host driver instance at a host device, wherein the host driver instance comprises: means for sending authentication credential of a user to a data storage device; means for receiving a unique user identifier, from the data storage device, that is associated with the authentication credential of the user; means for receiving, from the data storage device, a plurality of data file identifier corresponding to a plurality of stored user data files that are stored in the data storage device; and means for enumerating a directory of stored user data files that are associated with the user. To enumerate the directory comprises: comparing the unique user identifier to each of the plurality of data file identifiers, and including a reference in the directory to stored user data files for which the unique user identifier and the data file identifier are matched. The host drive instance also comprises means for providing the directory from the host driver instance to the host device.

In some embodiments, the host drive instance further comprises: means for receiving, from the host device, a request to write a new user file to be stored in the data storage device; add, by the host driver instance, the unique user identifier to a data file identifier associated with the new user data file; and write the new user file and data file identifier associated with the new user file to the storage medium.

DESCRIPTION OF EMBODIMENTS

In the following detailed description, various aspects of a data storage device in communication with a host device will be presented. These aspects are suited for flash storage devices, such as SSDs (solid-state drive) and SD (Secure Digital) cards. However, those skilled in the art will realize that these aspects may be extended to all types of data storage devices capable of storing data. This can include data storage devices that include magnetic storage such as hard disk drives and tape drives. In yet further examples, the data storage device can be a combination of flash memory and magnetic storage such as a hybrid drive. Accordingly, any reference to a specific apparatus or method is intended only to illustrate the various aspects of the present disclosure, with the understanding that such aspects may have a wide range of applications without departing from the spirit and scope of the present disclosure.

Overview of the System Components

Figure 1:
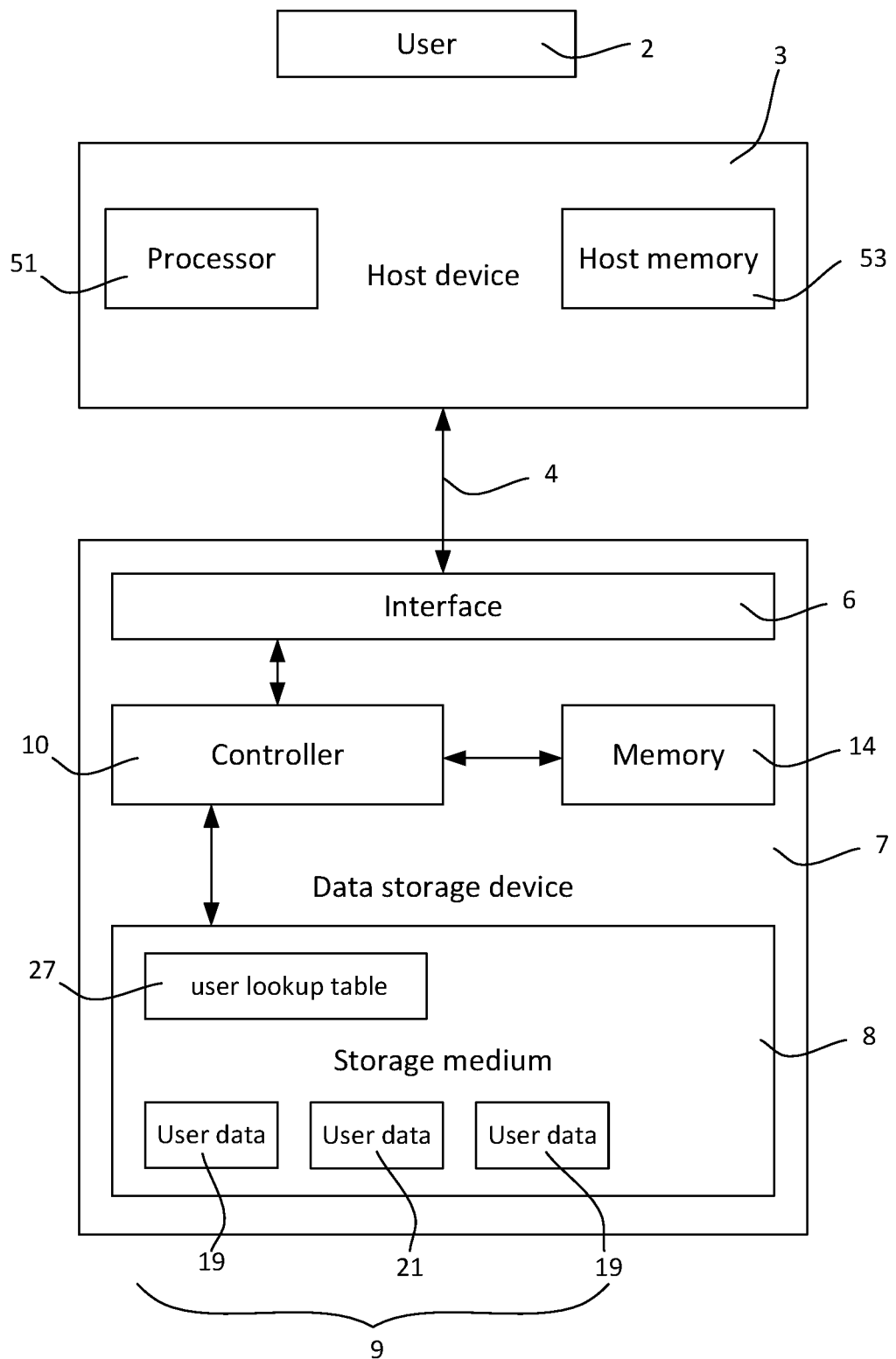
FIG. 1 illustrates a system of a host device with a data storage device in a first example.

FIG. 1 illustrates a system 1 including a data storage device 7 that is in communication with a host device 3.

The host 3 and the data storage device 7 may form a system 1, such as a computer system (e.g., server, desktop, mobile/laptop, tablet, smartphone, etc.). The components of FIG. 1 may or may not be physically co-located. In this regard, the host device 3 may be located remotely from the data storage device 7. Alternatively, the host device 3 may be distributed across multiple remote entities, in its entirety, or alternatively with some functionality in the data storage device 7.

The system 1 and method 100 disclosed herein is directed to enable multiple users to have user-based access to user data files 9, 19, 21 stored on the data storage device 7. Data to authenticate users 2 are stored at the data storage device 7 that can enable selective access that is agnostic to the particular host device 3 and operating system. Instead of partitioning the storage medium 8 for respective users, the data storage device 7 disclosed herein is directed to associating a unique user identifier 15 for each user data file 9, 19, 21. In particular including the unique user identifier 15 to at least part of a respective data file identifier 23 (also known as file system meta data) of each user data file 9, 19, 21.

Figure 3:
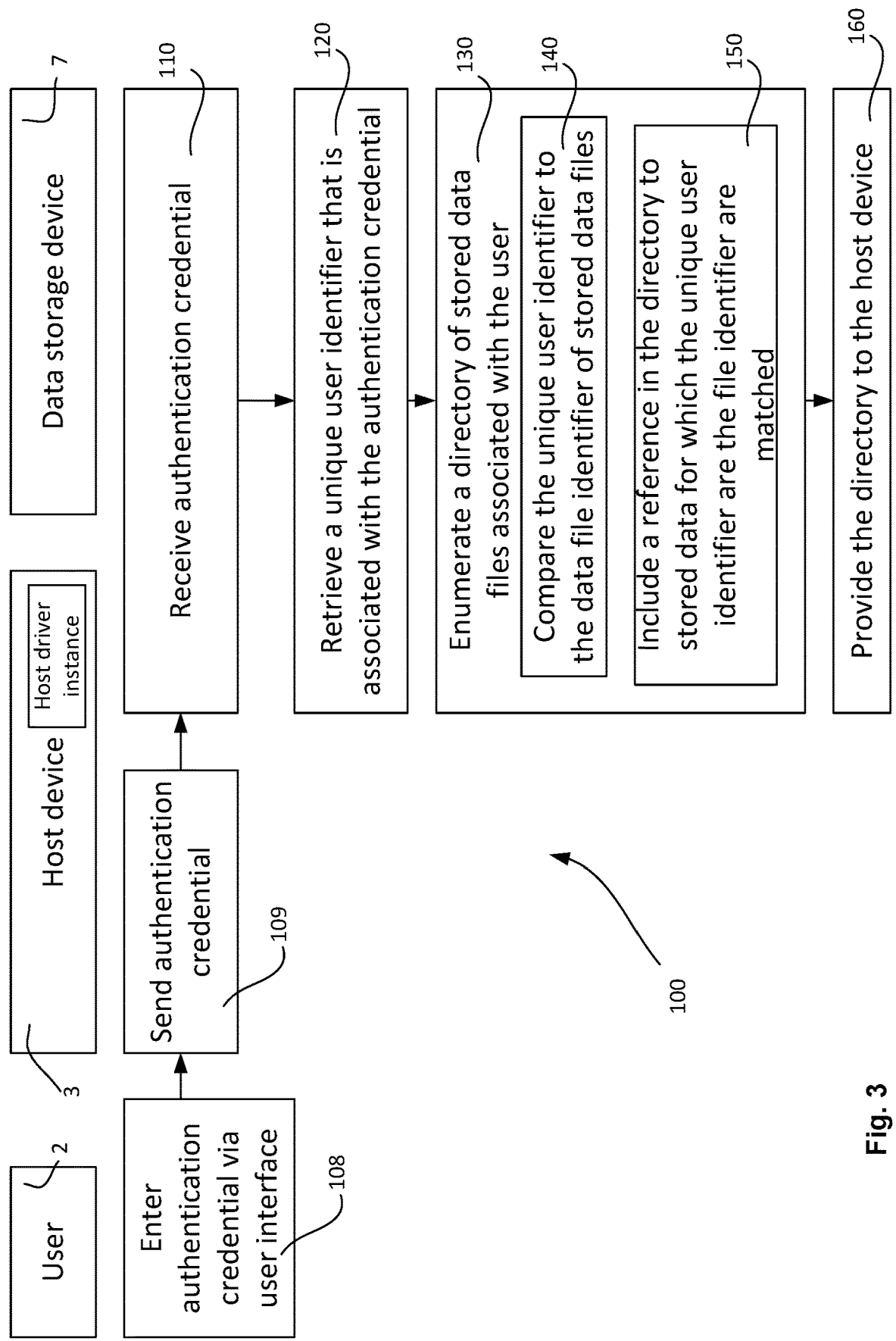
FIG. 3 is a flow diagram of a method of selectively enabling access to stored use data files in the system of FIG. 1.

The disclosed system 1 involves associating a particular user's authentication credential 11, 13 with the unique user identifier 15. Referring to FIG. 3, when a user 2 attempts to access the data storage device 7, the authentication credential 11, 13 of that user 2 is sent 109 from the host device 3 and received 110 at the data storage device 7. Using the authentication credential 11, 13, the data storage device 7 retrieves the unique user identifier 15 that is stored at the data storage device 7. The system 1 then enumerates 130 a directory 17 of stored user data files 9, 19, 21 by comparing the retrieved unique user identifier 15 to the data file identifiers 21 of the stored user data files 9, 19, 21 in the data storage device 7. In response to the comparison, the system 1 includes 150 a reference in the directory 17 to stored user data files for which the unique user identifier 15 and the data file identifier 23 are matched. The match represents the user data files that the particular user 2 are permitted to access. This directory 17 is then provided to the host device 3 so that the user 2 can view their user data files.

An advantage of embodiments of this disclosure is that at any point in time, free space available in the storage medium 8 is available to all valid users. This is in contrast with other systems that require resizing of partitions to enable a user to user free space that is from another partition.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the data storage device 7, or multiple data storage devices 7 communicating with the host(s).

The Host Device 3

The host device 3 may store data to, and/or retrieve data from, the data storage device 7. The host device 3 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 3 includes at least one processor 51 and host memory 53. The at least one processor may include any form of hardware capable of processing data and may include a general processing unit (such as a central processing unit (CPU)), dedicated hardware (such as an application specific integrated circuit (ASIC)), digital signal processor (DSP), configurable hardware (such as a field programmable gate array), or any other form of processing unit configured by way of software instructions, firmware, or the like. The host memory 103 may be used by the host device to store data or instructions processed by the host or data received from the data storage device 7. In some examples, the host memory 53 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 53 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

An interface 6 is configured to interface the data storage device 7 with the host device 3 via a bus/network 4, and may interface using, for example, Ethernet or Wi-Fi, or a bus standard such as Serial Advanced Technology Attachment (SATA), PCI express (PCIe), Small Computer System Interface (SCSI), or Serial Attached SCSI (SAS), among other possible candidates. Alternatively, the interface 6 may be wireless, and may interface the data storage device 7 with the host 3 using, for example, cellular communication (e.g. 5G NR, 4G LTE, 3G, 2G, GSM/UMTS, CDMA One/CDMA2000, etc.), wireless distribution methods through access points (e.g. IEEE 802.11, Wi-Fi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The Data Storage Device 7

As shown in the exemplary embodiment of FIG. 1, the data storage device 7 includes storage medium 8 in the form of non-volatile memory (NVM) for non-volatilely storing data received from the host device 3. The storage medium 8 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The storage medium 8 may include a plurality of memory locations which may store system data for operating the data storage device 7, a user lookup table 27 (described in detail below) or user data received from the host device 3 for storage in the data storage device 7. For example, the storage medium 8 may have a cross-point architecture including a 2-D NAND array of memory locations having n rows and m columns, where m and n are predefined according to the size of the storage medium 8. Each memory location may be a block including multiple cells. The cells may be SLCs, MLCs, TLCs, QLCs, and/or PLCs, for example. Other examples of memory locations are possible; for instance, each memory location may be a die containing multiple blocks. Moreover, each memory location may include one or more blocks in a 3-D NAND array. Moreover, the memory locations may be logical blocks which are mapped to one or more physical blocks.

The data storage device 7 also includes a volatile memory 14 that can, for example, include a Dynamic Random Access Memory (DRAM) or a Static Random Access Memory (SRAM). Data stored in volatile memory 14 can include data read from the storage medium 8 or data to be written to the storage medium 8. In this regard, the volatile memory 14 can include a write buffer and a read buffer for temporarily storing data. While FIG. 1 illustrates the volatile memory 14 as being remote from a controller 10 of the storage device 7, the volatile memory 14 may be integrated into the controller 10.

Figure 2:
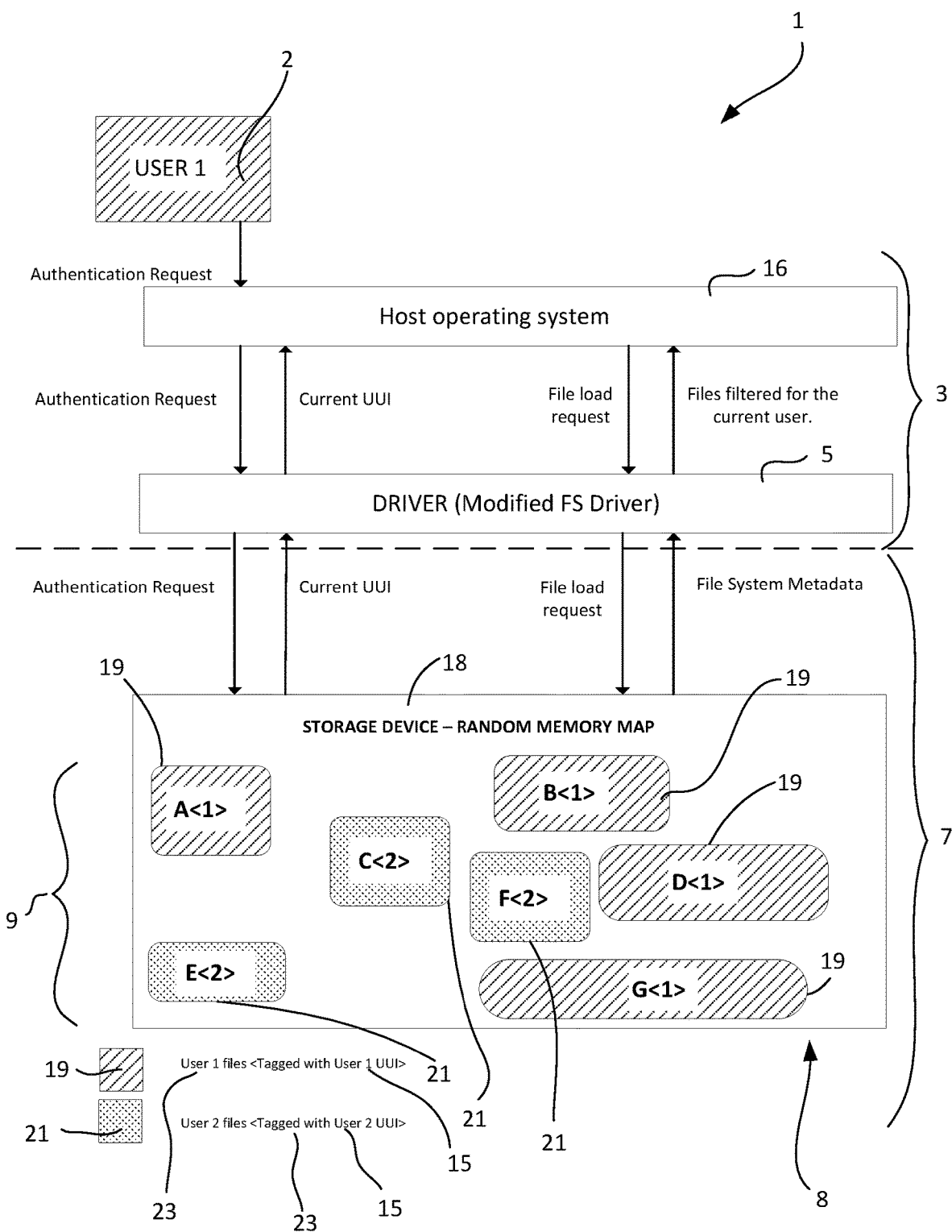
FIG. 2 is a conceptual diagram of part of the system of FIG. 1.

The memory (e.g. storage medium 8) is configured to store user data 9, 19, 23 received from the host device 3. The data may be stored in the cells of any of the memory locations. As an example, FIG. 2 illustrates user data 19 of a particular user 2 being stored in different memory locations.

Each of the data 9 may be associated with a logical address. For example, the storage medium 8 may store a logical-to-physical (L2P) mapping table for the data storage device 7 associating each data 9, 19, 21 with a logical address. The L2P mapping table stores the mapping of logical addresses specified for data written from the host device 3 to physical addresses in the storage medium 8 indicating the location(s) where each of the data is stored. This mapping may be performed by the controller 10 of the storage device. The L2P mapping table may be a table or other data structure which includes an identifier such as a logical block address (LBA) associated with each memory location in the storage medium 8 where data is stored.

The volatile memory 14 also stores a cache for the data storage device 7. The cache includes entries showing the mapping of logical addresses specified for data requested by the host device 3 to physical addresses in storage medium 8 indicating the location(s) where the data is stored. This mapping may be performed by the controller 10. When the controller 10 receives a read command or a write command for user data 9, 19 21, the controller checks the cache for the logical-to-physical mapping of each data. If a mapping is not present (e.g. it is the first request for the data), the controller accesses the L2P mapping table 120 and stores the mapping in the cache 122. When the controller 10 executes the read command or write command, the controller accesses the mapping from the cache and reads the data from or writes the data to the storage medium 8 at the specified physical address. The cache may be stored in the form of a table or other data structure which includes a logical address associated with each memory location 112 in storage medium 8 where data is being read.

The storage medium 8 includes sense amplifiers 124 and data latches connected to each memory location. For example, the memory location may be a block including cells on multiple bit lines, and the storage medium 8 may include a sense amplifier on each bit line. Moreover, one or more data latches may be connected to the bit lines and/or sense amplifiers. The data latches may be, for example, shift registers. When data is read from the cells of the memory location, the sense amplifiers sense the data by amplifying the voltages on the bit lines to a logic level (e.g. readable as a '0' or a '1'), and the sensed data is stored in the data latches. The data is then transferred from the data latches to the controller 10, after which the data is stored in the volatile memory until it is transferred to the host device. When data is written to the cells of the memory location, the controller 10 stores the programmed data in the data latches, and the data is subsequently transferred from the data latches to the cells.

The data storage device 7 includes a controller 10 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 10 is configured to receive data transferred from one or more of the cells of the various memory locations in response to a read command. For example, the controller 10 may read the data by activating the sense amplifiers to sense the data from cells into data latches, and the controller 10 may receive the data from the data latches. The controller 10 is also configured to program data into one or more of the cells in response to a write command. For example, the controller 10 may write the data by sending data to the data latches to be programmed into the cells. The controller 10 is further configured to access the L2P mapping table in the storage medium 8 when reading or writing data to the cells. For example, the controller 10 may receive logical-to-physical address mappings from the storage medium 8 in response to read or write commands from the host device 3, identify the physical addresses mapped to the logical addresses identified in the commands, and access or store data in the cells located at the mapped physical addresses.

The controller 10 may be further configured to access the memory locations in parallel. For example the memory locations may be blocks stored on different dies of the storage medium 8, and each die may be connected to the controller 10 by its own data bus. The controller may read or write data to the cells on the different dies simultaneously over the multiple data buses. Additionally, the controller 10 may be configured to refrain from accessing the memory locations in parallel, and may instead access the memory locations serially. For example, the controller may determine to read or write data to the cells of a memory location in sequence rather than simultaneously over the multiple data buses.

The controller 10 is also configured to perform, at least in part, the computer-implemented method 100 described in further detail below. This includes generating a unique user identifier 15 and retrieving the unique user identifier 15 for a host device driver instance 5 at the host device 3.

The controller 10 and its components may be implemented with embedded software that performs the various functions of the controller described throughout this disclosure. Alternatively, software for implementing each of the aforementioned functions and components may be stored in the storage medium 8 or in a memory external to the data storage device 7 or host device 3, and may be accessed by the controller 10 for execution by the one or more processors of the controller 10. Alternatively, the functions and components of the controller may be implemented with hardware in the controller 10, or may be implemented using a combination of the aforementioned hardware and software.

Overview of the Method of Selectively Enabling Access to Stored User Data Files

FIG. 2 illustrates a conceptual diagram of the system 1. The host 3 includes a host operating system 16 that, through a host driver instance 5, communicates with the data storage device 7. The host driver instance 5 may be based on an executable computer-readable program code that is shipped with the data storage device 7. In some other examples, the executable code is otherwise supplied to the host device 3, including downloading to the host device via a communications network such as the internet.

The conceptual diagram of FIG. 2 also illustrates a memory map 18 of the storage medium 8 of the data storage device 7 (with other portions such as the user lookup table 27 not shown for brevity). The memory map 18 shows user data files 19 of a first user and user data files 21 of a second user that are stored at various locations in the data storage medium 8. Since the user data files 9, 19, 21 with respective data file identifiers 23 are associated to their respective users by the unique user identifiers 15, it is not necessary to partition the storage medium 8 for respective users.

Figure 4:
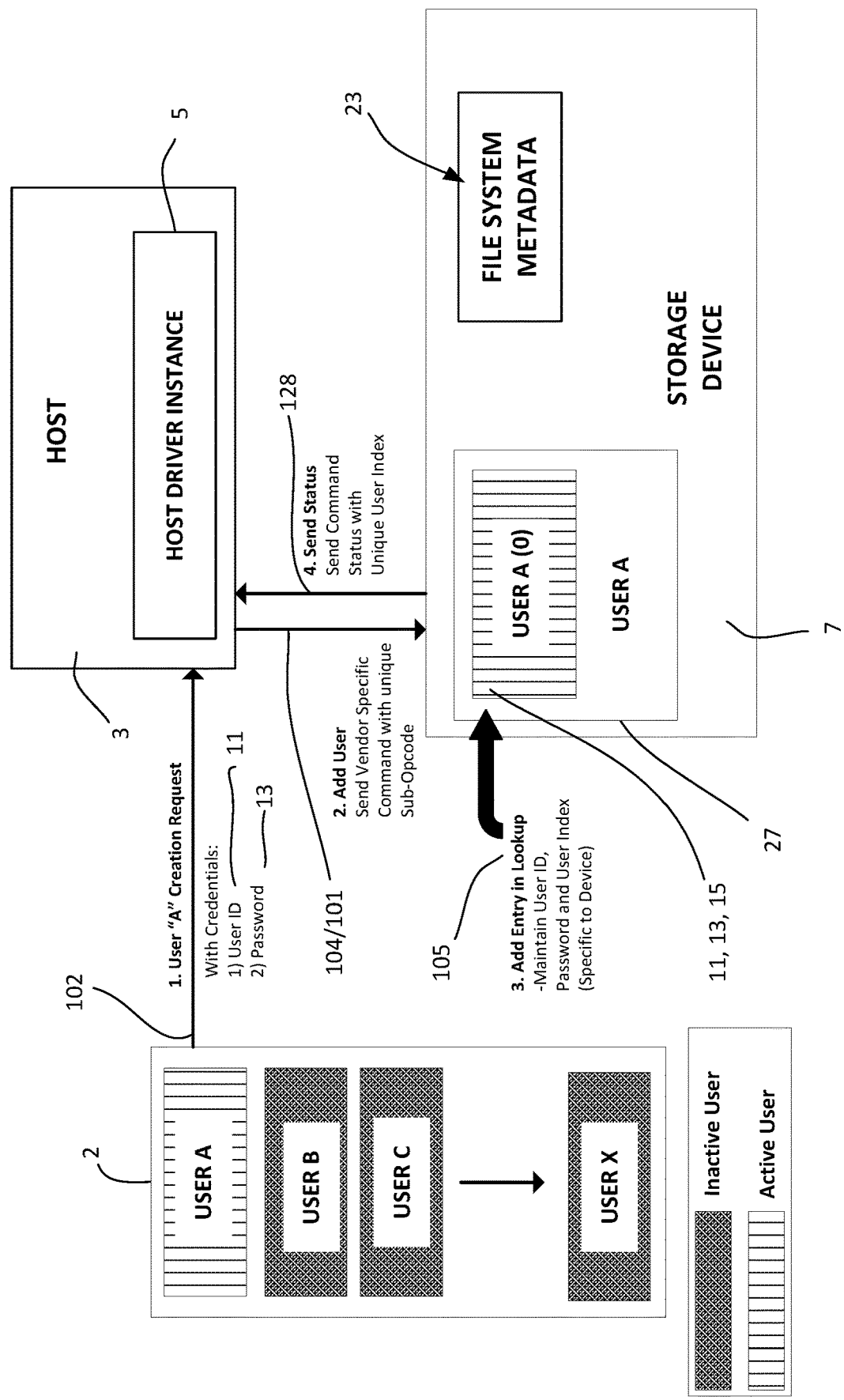
FIG. 4 is a schematic of the system of FIG. 1 during registration of a user.
Figure 5:
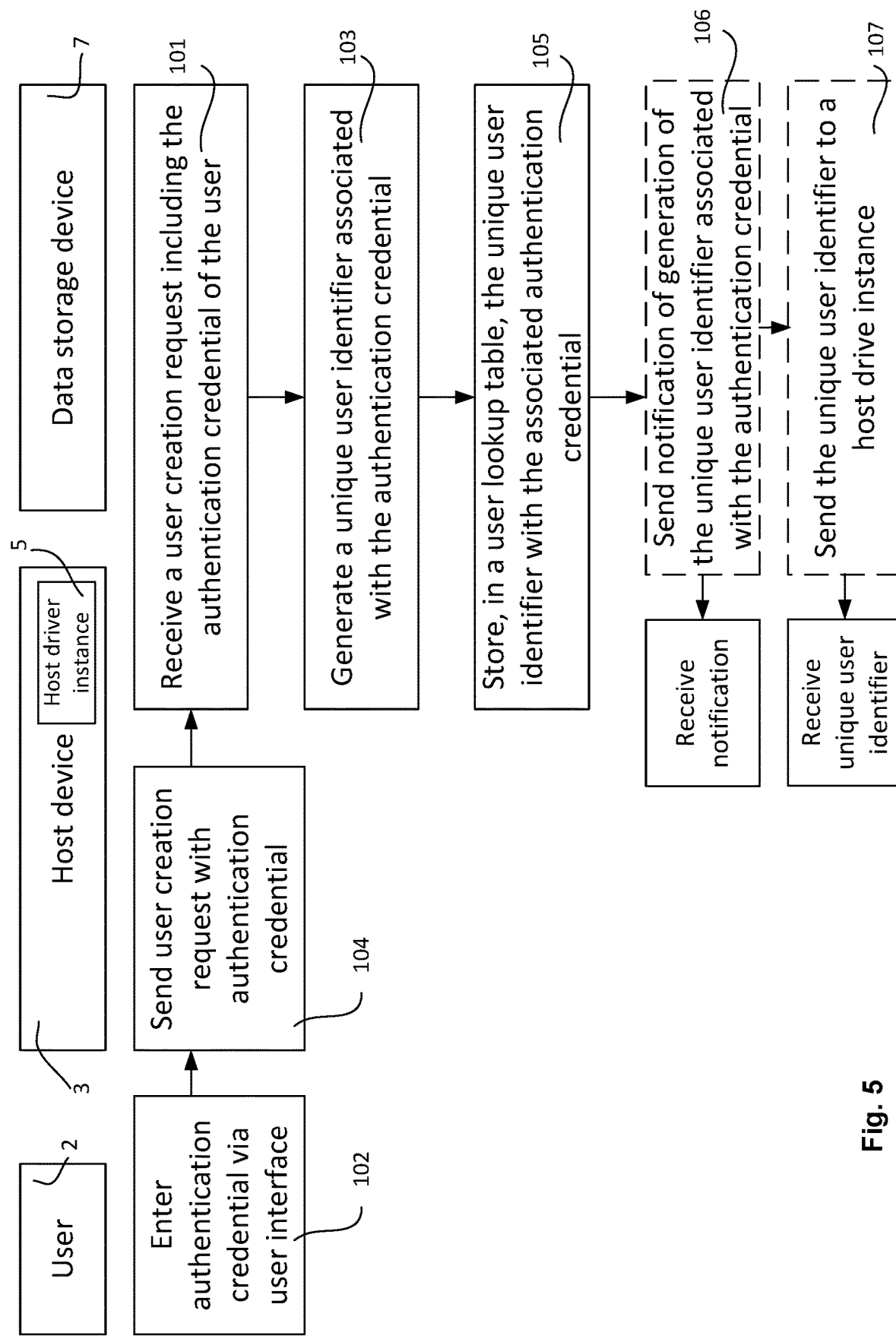
FIG. 5 is a flow diagram of a method of registration of a user.

The method 100 of selectively enabling access will now be described in detail in a first example, including the following phases:

User registration
Verification of a user and enumeration of a directory of the user
Data writing
Data reading
User deletion
User Registration The data storage device 6 can support multiple users 2. FIG. 4 illustrates a schematic of the system 1 during registration and FIG. 5 illustrates a flow diagram of a respective method of registering a user.

In this example a host drive instance 5 is instantiated at the host device 3. This can include loading the host driver to the host memory 53 and executing the respective program code at the processor 51 of the host device 3. The host driver may be downloaded from a network. In other examples, the host driver may be stored on non-volatile memory and sent to the host device 3. In some alternatives, this can include storing the host driver in the storage medium 8.

A new user 2 can enter 102 their authentication credentials 11, 13 for registration via a user interface associated with the host device 3. The authentication credentials 11, 13 can include a username 11 and a password 13. It can be appreciated that other forms of credentials can be used to authenticate a user. For example, the authentication credentials can include unique biometric characteristics of a user.

The host device 3, via the host drive instance 5, sends 104 a user creation request that includes the authentication credentials 11, 13 of the user 2. At the data storage device 7, the controller 10, in a registration mode, receives 101 the user creation request and authentication credentials 11, 13 of the proposed new user 2.

The controller 10 may scan the user lookup table 27, or other record, in the storage medium 8 to check that the authentication credentials 11, 13 of the proposed new user 2 do not coincide with an existing record. For example, checking that the same username 11 has not been used by the same, or another, user. If the proposed authentication credentials 11, 13 match existing records, an error notification can be returned to the host device 3 to prompt the user to enter new authentication credentials 11, 13 or inform the proposed user that they are already registered.

The controller 10 may also perform other checks to ensure that the authentication credentials 11, 13 are properly formed. For example, meeting minimum security requirements such as length and complexity of the username 11 or password 13.

The controller 10 generates 103 a unique user identifier 15 to be associated with the authentication credentials 11, 13. In some examples, the unique user identifier 15 is of sufficient size to reduce the likelihood that another use will be assigned the unique user identifier 15. In some examples, the controller 10 performs a check of the user lookup table 27 to ensure that the generated unique user identifier 15 is, in fact, unique over any existing records in the user lookup table 27.

The unique user identifier 15 and associated authentication credentials 11, 13 are stored 105 in the user lookup table 27. In some examples, the user lookup table 27 is stored in the storage medium 8 (that also stores the user data files 9, 19, 21). In other examples, the data storage device 7 has a storage medium (of non-volatile memory) to store the user lookup table 27 that is separate to the storage medium storing the user data files.

In some examples, the user lookup table 27 contains tuples of information associated with each user, including the username 11, password 13, and unique user identifier 15. The user lookup table 27 is configured to contain multiple entries so that multiple users can be registered to the data storage device 7. Since the user lookup table 27 is stored on the data storage device 7, the data storage device 7 can be disconnected and used at another host device 3 (which may use another operating system) without having to separately update a corresponding user lookup table at the other host device.

The generated unique user identifier 15 may then be sent 107 to the host driver instance 5. This enables the host driver instance 5 to use the unique user identifier 15 in some functions including: filtering of user data files 9, 19, 21 for access to the respective user; and incorporating the unique user identifier 15 to user data files (and/or respective data file identifiers 23, or associated metadata). In some examples, the controller 10 may also update 126 an authentication status that is indicative of the user 2 having provided valid authentication credentials 11, 13 and that a unique user identifier 15 has been generated. The controller 10 can further send 128 the authentication status to the host driver instance 5.

The data storage device 7 may be configured to require valid authentication credentials 11, 13 to be received at the controller 10 before a respective a unique user identifier 15 is accessible for additional functions. This may include a multiple step process of receiving authentication credentials and verifying them at the user lookup table 27 before the unique user identifier 15 can be retrieved 120 by the controller 10.

Verification of a User and Enumeration of a Directory of the User

Figure 6:
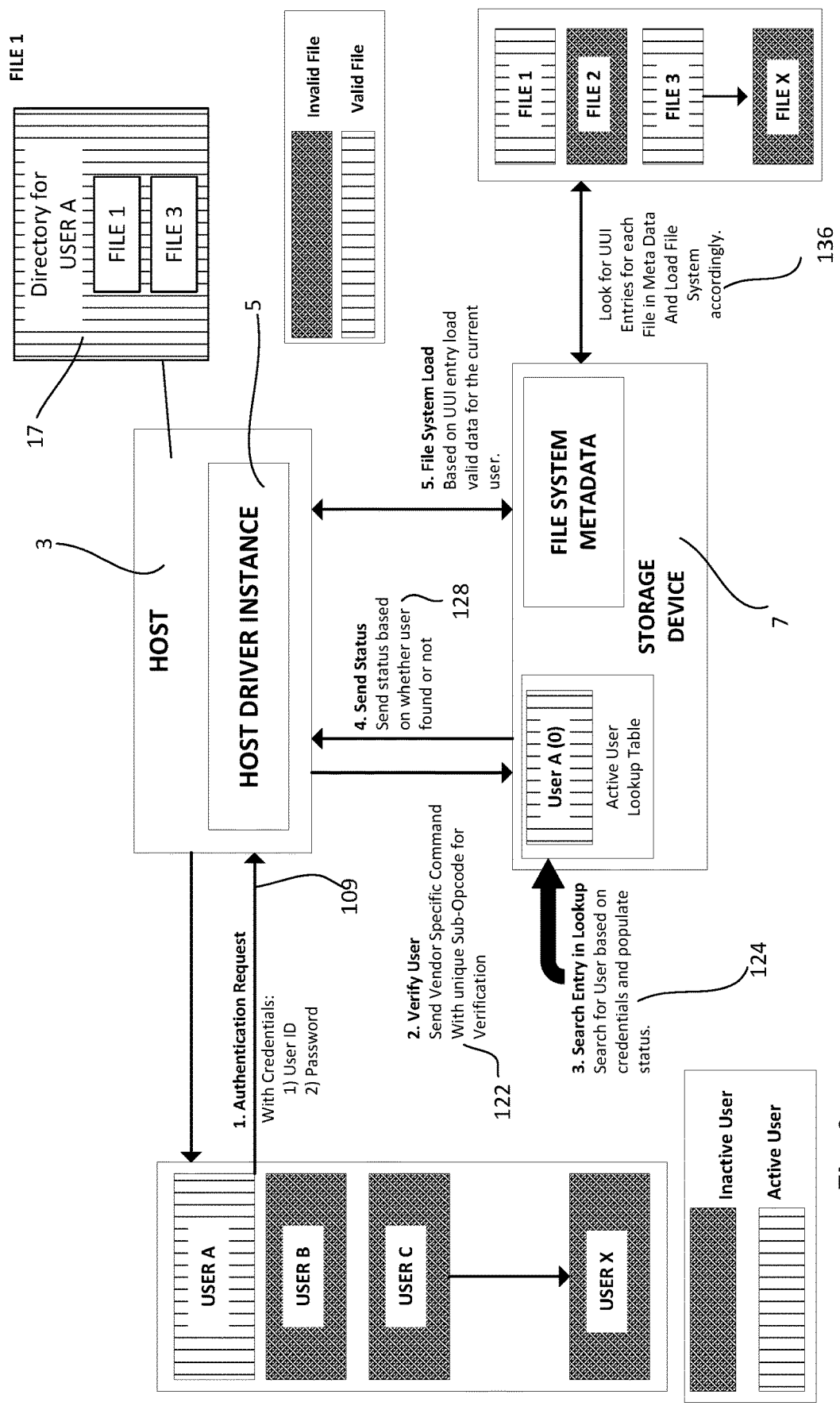
FIG. 6 is a schematic of the system of FIG. 1 enumerating a directory of stored user data for the host device.

The process of verification of a registered user to enable access to stored user data files 9 in the data storage device involves authentication of the user and subsequently enumeration of a directory of files accessible of that user as illustrated in FIG. 6.

This can involve a user connecting the data storage device 7 to a host device 3 having the host driver. The user 2 enters 108 their authentication credential 11, 13 at a user interface of the host device 3. In turn, the host device 3 sends 109 the authentication credential 11, 13 to be received 110 at the data storage device 7. In some examples, this includes sending the authentication credential 11, 13 via the host driver instance 5.

Figure 7:
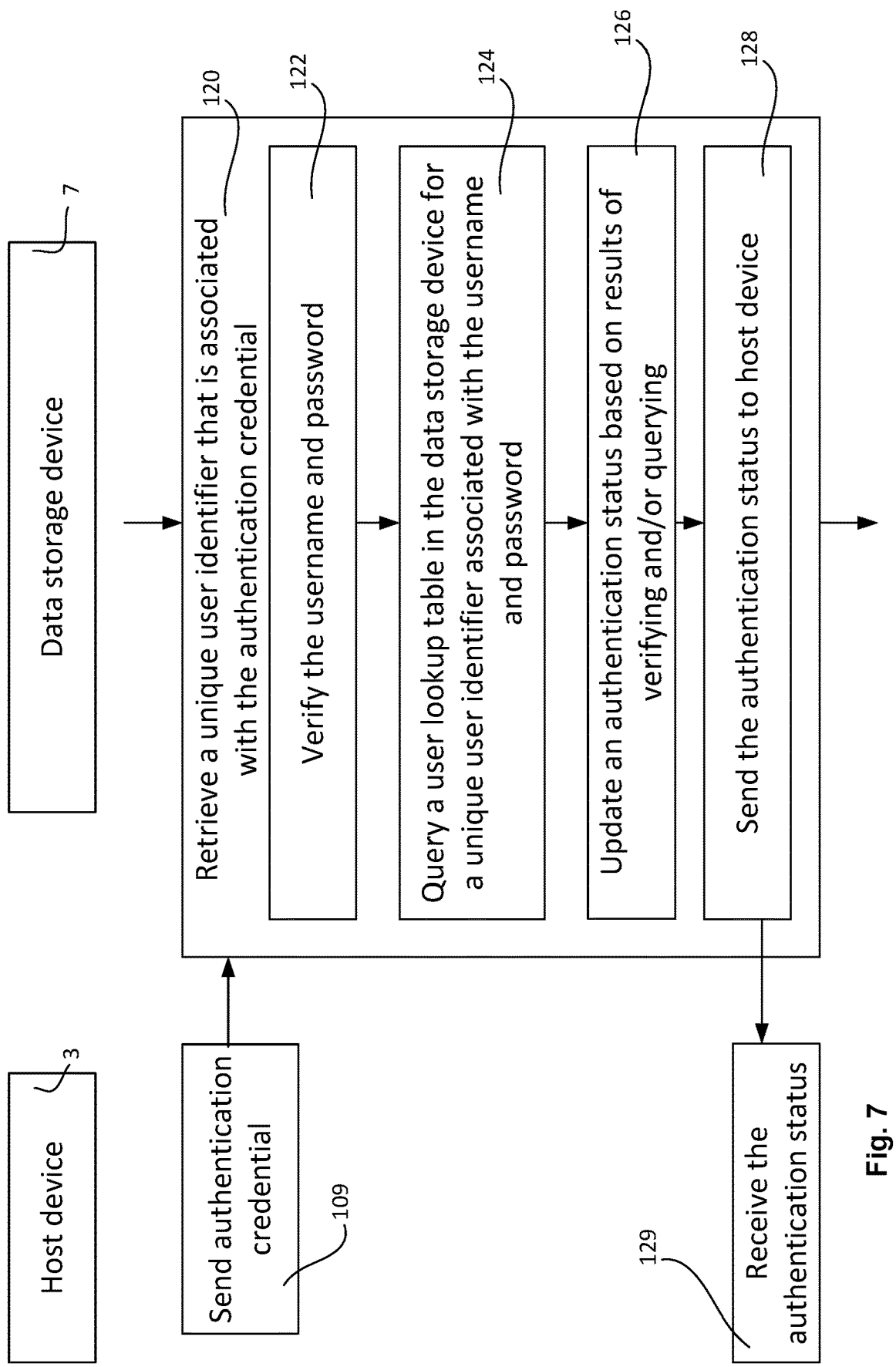
FIG. 7 is a flow diagram of a method of authenticating a user to the data storage device.

The authentication credential 11, 13 is used to retrieve 120 the unique user identifier 15 of the user 2. In some examples, this can include multiple steps as illustrated in FIG. 7. For example, authentication credentials 11, 13 that are in the form of a username 11 and password 13 can be used to verify 122 the user for authentication. In other examples, the authentication credential 11, 13 can include a user's biometric data that is used to authenticate the user. The step of verifying 122 can include identifying if the authentication credentials 11, 13 match records in the user lookup table 27 or other record 28 in the storage medium of the data storage device 7.

Retrieving 120 the unique user identifier 15 can also include querying 124 the user lookup table 27 in the storage medium 8 of the data storage device associated with the authentication credentials 11, 13. A particular user 2 can have a tuple record in the user lookup table 27 comprising a username 11, password, 13, and the unique user identifier 15. Thus querying the user lookup table 27 involves identifying the tuple record that matches the received username 11 and password 13.

The method 100 also includes updating 126 an authentication status of the purported user 2 of the host device 3 and data storage device 7. The authentication status can include an indication that the authentication credentials are verified 122 or a unique user identifier 15 (corresponding to the received authentication credentials) has been successfully retrieved.

The method can also include sending 128 the authentication status to the host device 3. In some examples, this can include receiving 129 a notification of the status that can be used, by the host device 3, to notify the user 2 of that fact. In other examples, the authentication status can include sending 107 the retrieved unique user identifier 15 to the host driver instance 5.

The method includes enumerating 130 a directory 17 of stored user data files 9, 19, 21 that is associated with the user 2. Generally, this involves filtering the stored user data files 9, 19, 21 in the data storage device 7 with the unique user identifier 15 so that only those that are associated with the user are enumerated in the directory 17. Referring to FIGS. 2 and 6 as an example, the storage medium 8 contains stored user data files 9 that included first user data files 19 of a first user and second user data files 21 of a second user. So in the instance where the first user provides their authentication credentials, the directory 17 should be enumerated to show only the first user data files 19.

Figure 8:
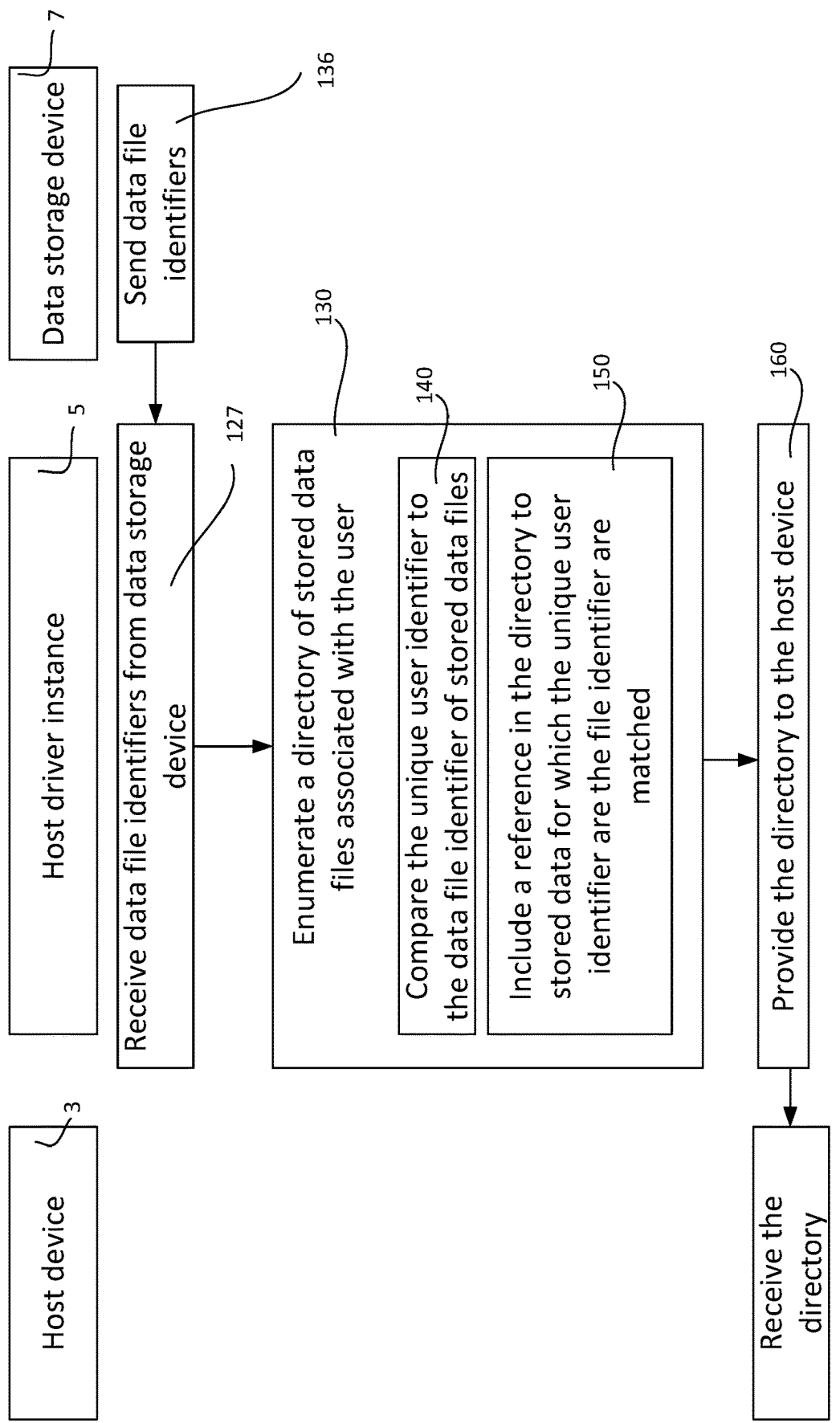
FIG. 8 is a flow diagram including further detail of steps to enumerate a directory of stored user data for the host device.

Referring to FIG. 8, enumerating 130 the directory 17 includes comparing the retrieved unique user identifier 15 to the data file identifiers 23 corresponding to the stored user data files 9, 19, 23. In some examples, the data file identifiers 23 include the metadata associated with each of the user data files 9 that are used by a file system of the data storage device 7. Enumerating the directory also involves including 150 a reference in the directory to the stored user data files 19 for which the unique user identifier 15 and the data file identifier 23 are matched.

In some examples, only the user data files 19 that are associated with matched unique user identifier and data files identifier 23 are visible in the directory 17 provided to the user 2 of the host device 3. This can be a security and privacy aspect so that only an authenticated user 2 that should have access to those user data files 19 can view the existence of such files.

In some examples, enumerating 130 the directory is performed, at least in part, by the host driver instance 5 at the host device. Therefore in one example, the data storage device 6 sends 136 to the host driver instance 5, the data file identifiers 23 of all the stored user data files 9, 19, 21 in the storage medium 8. The host driver instance 5 received 127 the data file identifiers 23 and then performs the step of comparing 140 the unique user identifier (that was received during verification) with the received data file identifier 23. The host driver instance 23 then selects those user data files 19 where the corresponding data file identifiers 23 match the unique user identifier, whereby a reference is then made in the directory of those selected files.

In some examples, the data storage device is configured to send 136 the data file identifier 23 of the user data files in response to successful retrieving 120 of the unique user identifier 15. This can be advantageous to prevent a malicious user without a user account on the data storage device 7 from receiving any information on the user data files in the storage medium 8.

In further examples, some of the steps of enumerating 130 the directory may be performed, at least in part, at the data storage device 6. For example, the data storage device 6 can filter 134 the data file identifiers so that only those files corresponding to the unique user identifier 15 of the supplied authentication credentials are selected and sent 136 to the host device 3 and host driver instance 5. This can be advantageous in preventing data file identifiers 23, corresponding to user data files of a user that is not currently using the data storage device 7, from being sent from the data storage device 7.

The directory is then provided 160 to the host device 3. This can include the host driver instance 5 providing the directory to the host device 3 where, in turn, the directory can be represented at a user interface for the user to browse and perform additional functions. This can include, for example, reading, writing, modifying, and deleting user data files 9, 19, 23.

Data Writing

Figure 9:
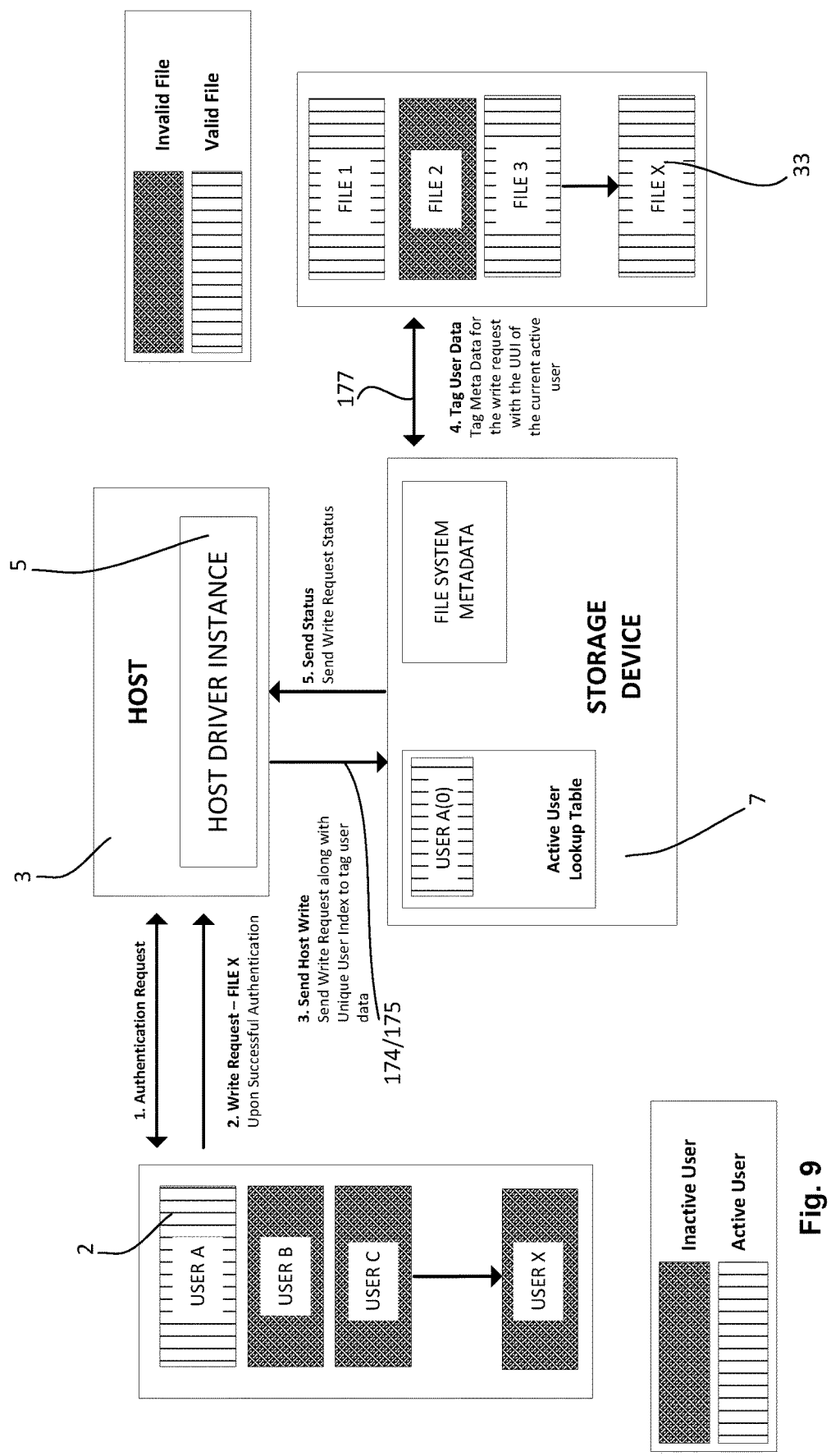
FIG. 9 is a schematic of the system of FIG. 1 during writing of a new user data file to the data storage device.
Figure 10:
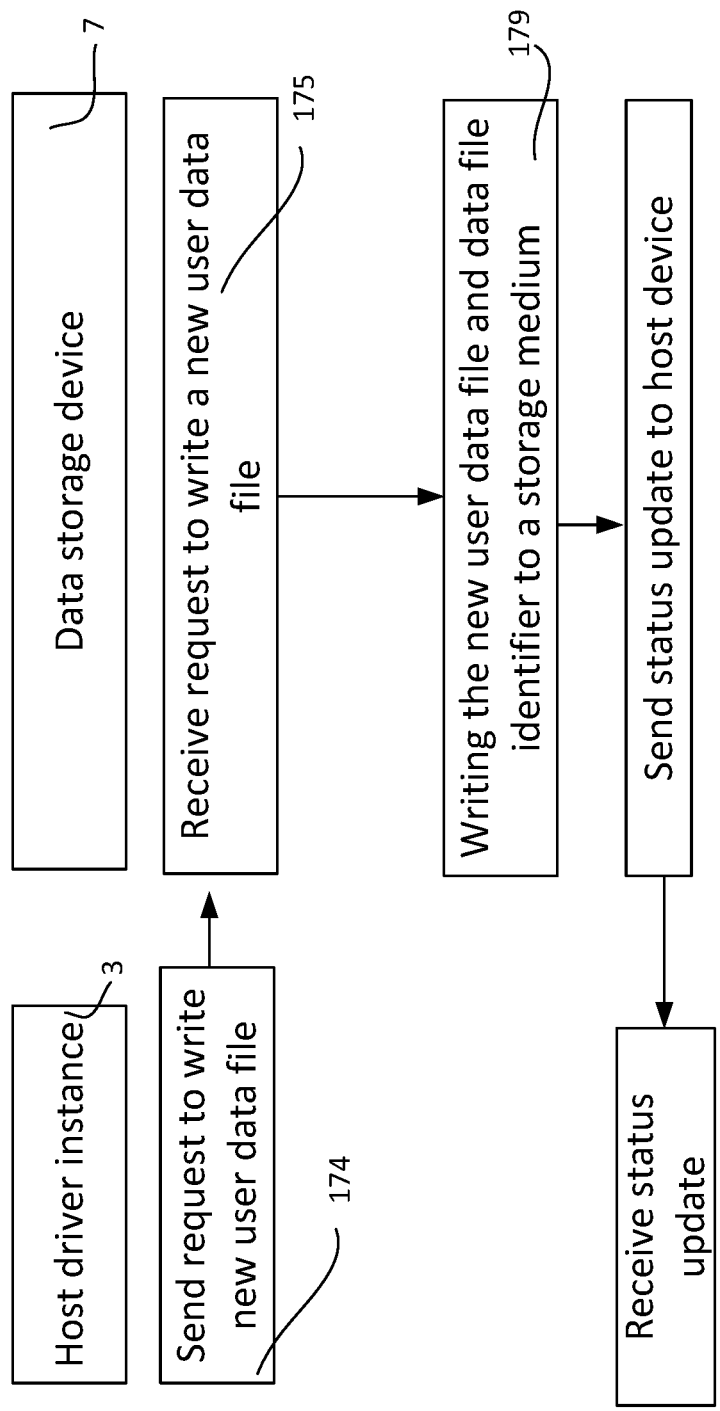
FIG. 10 is a flow diagram of a method of writing the new user data file to the data storage device.

An example of writing user data files is illustrated in FIGS. 9 and 10. Before a host device 3 can write to the data storage device 7, the user 2 is authenticated with the authentication credentials 11, 13 as described above.

The user 2, via the host device 3, can then send 174 a request to write a new user data file 33 to be stored in the data storage device 7. The unique user identifier 15, that is associated with the authentication credential 11, 13 of the authenticated user 2, is added to a data file identifier of the new user data file 33. The method then includes writing 179 the new user data file 33 and the data identifier associated with the new user data file 33 to a storage medium 8 of the data storage device 7.

In one example, adding or creating the data file identifier associated with the user data file 33 can be at the host driver instance 5. In this example, the host driver instance 5 receives 129 the unique user identifier 15 during the authentication. The host driver instance 5 also receives 170, from the host device 3, a request to write a new user data file 33 to be stored in the data storage device 7. The host driver instance 3 adds the unique user identifier 15 to a data file identifier associated with the new user data file 33. The new user data file 33 and data file identifier (with the unique user identifier) is then written 173 to the storage medium 8 of the data storage device 7.

In another example, adding the unique user identifier 15 includes creating or modifying the data file identifier at the data storage device 7. The step of receiving 170 a request to write a new user data file may include the new user data file 33 itself and the unique user identifier 15 of the user 2. The data storage device 7 then adds the unique user identifier to a data file identifier associated with the new user data file 33. This may be performed, at least in part, by the controller 10 of the data storage device 7. The new user data file and associated data file identifier (with the unique user identifier 15, can then be written 179 to the data storage device 8.

In an alternative example, the request to write a new user data file does not include the unique user identifier 15 of the user 2. Instead, the data storage device 7 can retrieve the unique user identifier 15 of the authenticated user 2, and add that unique user identifier 15 to the data file identifier. Thus in this example, it is not necessary to send the unique user identifier 15 between the host device 3 and the data storage device 7.

It is to be appreciated that modifying a stored user data file can involve similar steps as those described above for writing a user data file to the data storage device 7.

Data Reading

Before a host device 3 can read from the data storage device 7, the user 2 is authenticated and a directory of the stored user data files 19 available to that authenticated user is provided 160 to the host device 3. Such files in the directory include those that match the user's unique user identifier 15.

Figure 11:
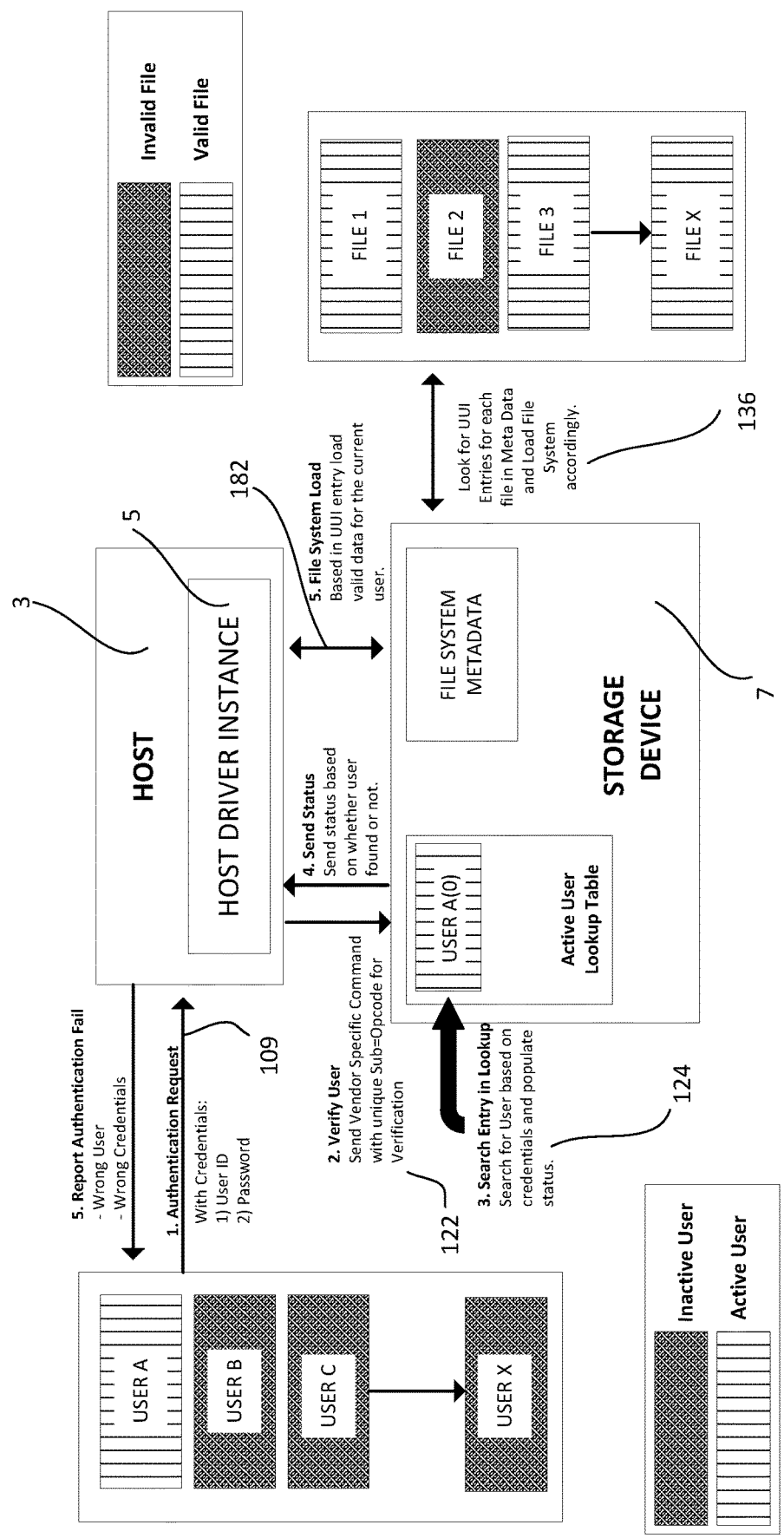
FIG. 11 is a schematic of the system of FIG. 1 during reading of stored user data files from the data storage device.
Figure 12:
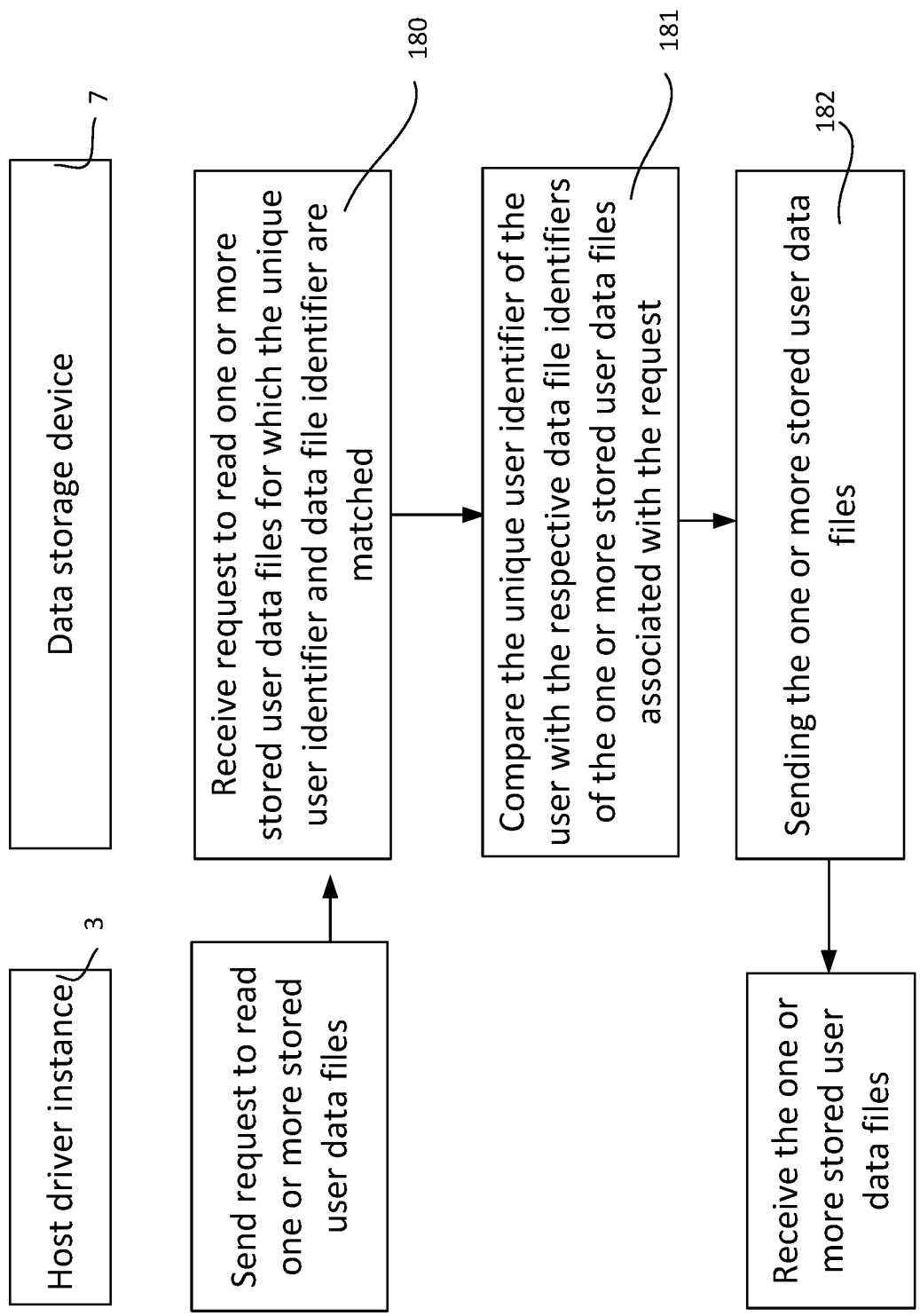
FIG. 12 is a flow diagram of a method of reading stored user data files from the data storage device.

A particular example of reading user data files is illustrated in FIGS. 11 and 12. This includes receiving 180, at the data storage device 7, a request to read one or more stored user data files 19 for which the unique user identifier 15 and the data file identifier 23 are matched. The data storage device 7, in response, sends 182 the one or more stored user data files 19 associated with that request to the host device 3.

The step of sending 182 the one or more stored user data files 19, in this example, is in response to at least two prerequisites.

Firstly, that the data storage device 7 receives 180 the request to read the one or more stored user data files 19 where the unique user identifier 15 of the user 2 match the respective data file identifiers 23 of requested user data files 19. This can include comparing 181 the unique user identifier 15 of the user with the respective data file identifiers 23 of the stored user data files associated with the request.

Secondly, that the authentication credentials 11, 13 of the user 2 have been verified 122. This can include verifying 122 the username 11 and password 13. In some examples, this can be based on verification 122 performed during earlier authentication of the user 2.

User Deletion

In some circumstances, a user 2 is deleted as a user of the data storage device 7. When deleting a user, this will involve removing records of that user 2 from the data storage device 7 including the unique identifier 15 and associated authentication credential 11, 13. In some examples, this also includes erasing all files associated with that user from the data storage medium 8.

Figure 13:
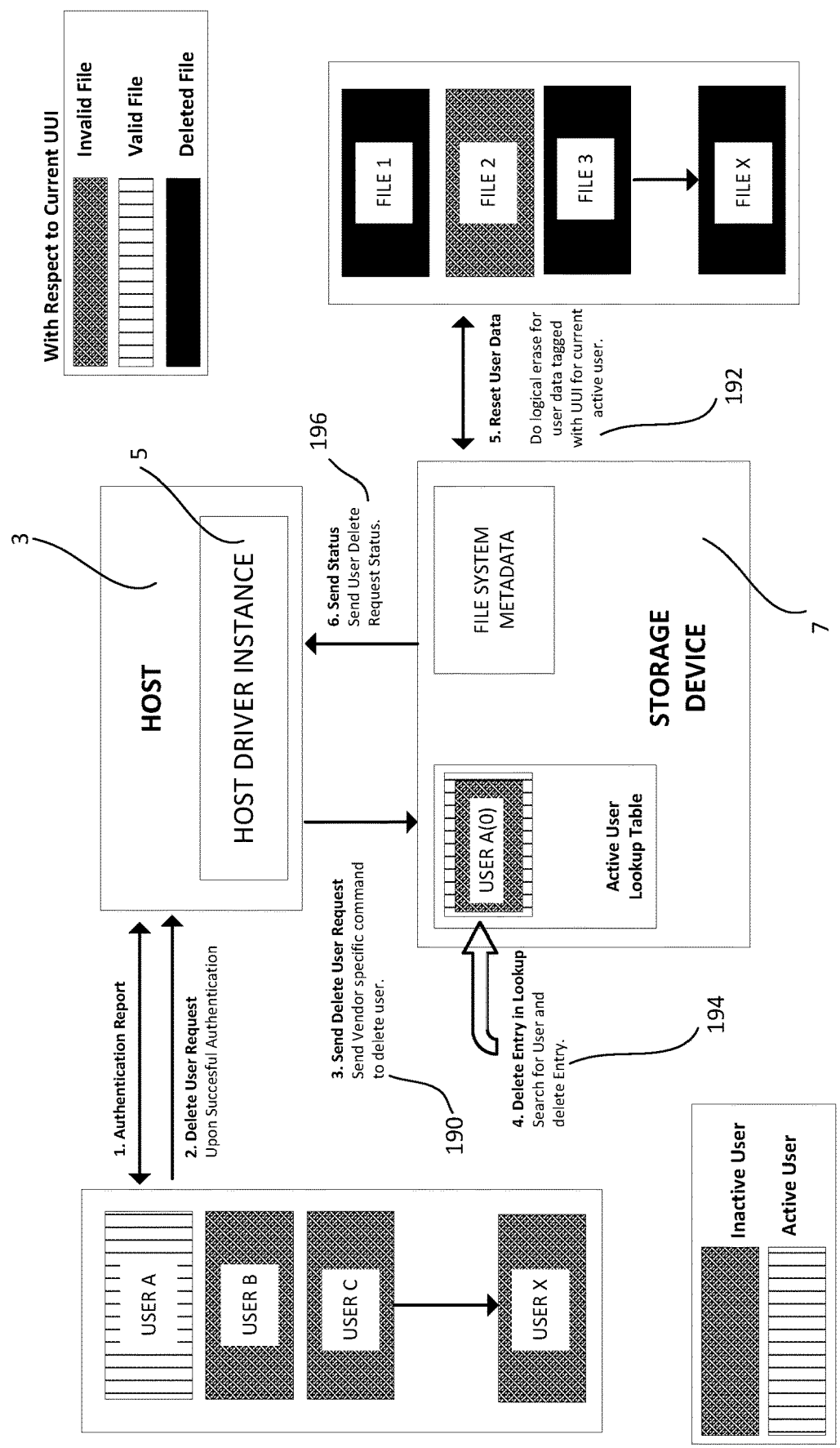
FIG. 13 is a schematic of the system of FIG. 1 during user deletion.
Figure 14:
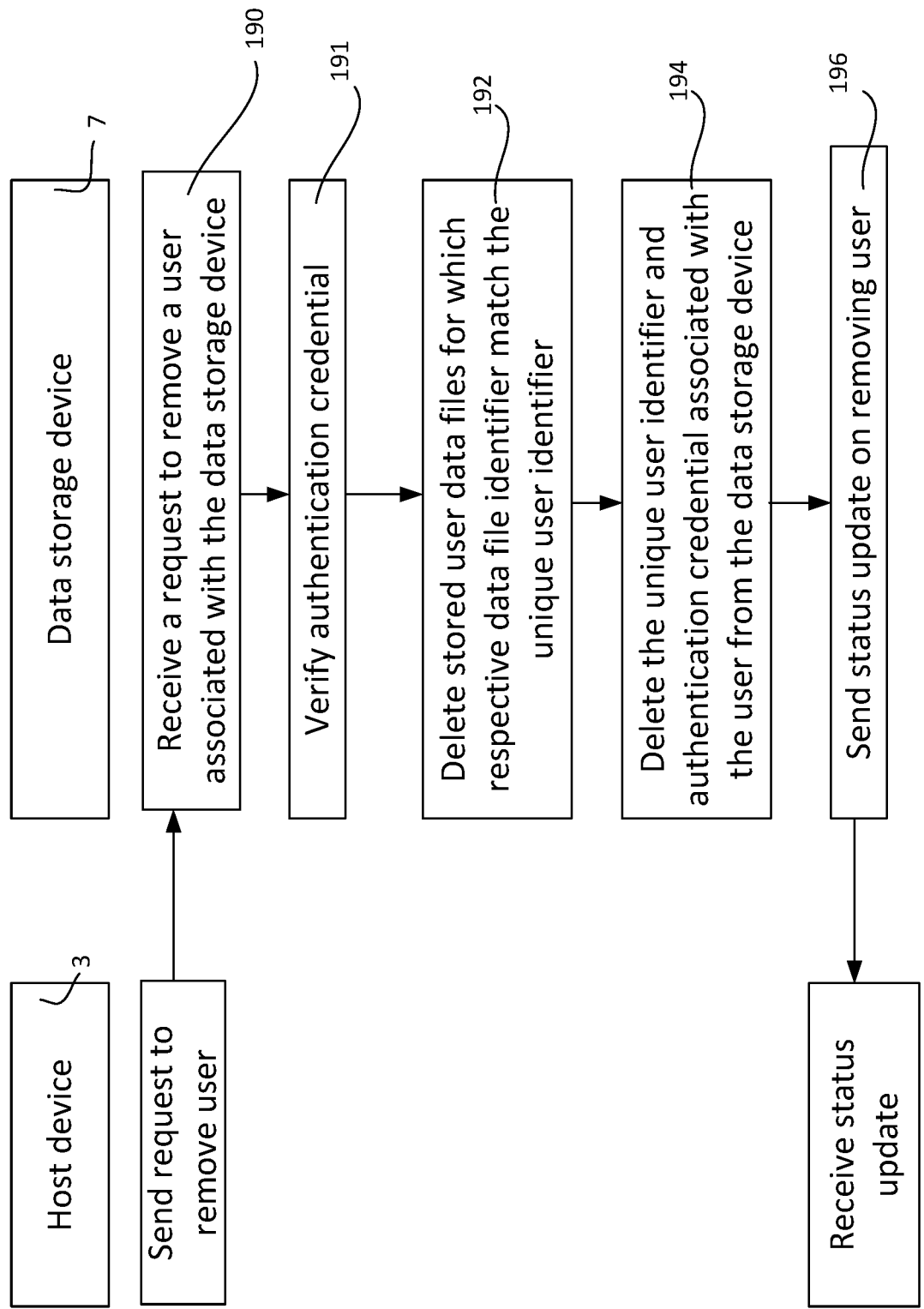
FIG. 14 is a flow diagram of a method of deleting a user from the data storage device.

An example of user deletion will now be described with reference to FIGS. 13 and 14. This involves receiving 190, from the host device 3, a request to remove a user 2 associated with the data storage device 7. The request to a user 2 includes the authentication credential 11, 13 of the user 2 and, in some examples, the unique user identifier 15 associated with the user 2. The data storage device 7 verifies 191 the authentication credential 11, 13 of the user 2 (such as verifying the username 11 and password 13) to prevent, or inhibit, a malicious user attempting to delete a user.

In response to receiving the request to remove a user 2 and verifying the authentication credential, the method includes deleting 192 stored user data files for which respective data file identifiers 23 match the unique user identifier 15. This can include performing a logical erase for all files in the storage medium 8 that have been tagged with the unique user identifier 15 in the data file identifier 23. The method also includes deleting 194 the unique user identifier 15 and authentication credential associated with that user from the data storage device 7. In a particular example, this includes deleting the unique user identifier 15, username 11, and password 13 from the user lookup table 27 in the storage medium 8.

In some examples, it is desirable to delete 192 the stored user data files before deleting 194 the unique user identifier and authentication credential 11, 13 from the user lookup table 27. This can be advantageous if the step of deleting 19 the stored user data files is disrupted before completion as performing further deletion function may require the unique user identifier 15.

When deleting the stored user data and user records in the user lookup table 27 is complete, the method may further include sending 196 a status update that the user has been removed to the host device 3.

Variations

The above examples include some steps of the method that are performed at the host drive instance 5 and at the data storage device 7. However, it is to be appreciated that some variations can be applied without departing from the scope of the disclosure. In some of the illustrated examples, the unique user identifier 15 is sent from the data storage device 7 to the host device driver instance 5 at authentication. In turn, the host driver instance 5 sends requests to the data storage device 7 to perform actions (such as reading, writing, modifying, or deleting a user) along with the unique user identifier 15. In some examples it is not necessary to send the unique user identifier 15 to the host device driver 15. Instead, upon verification of the user 2 during a session, the unique user identifier 15 can be temporarily stored at volatile memory 14 of the data storage device 7. When the user 2 sends requests (via the host device 3) to the data storage device 7, the controller 10 of the data storage device 7 may read that unique user identifier 15 in the volatile memory 14. In such a variation, the functions of the method that require the unique user identifier 15 are performed by the controller 10 of the data storage device 7.

In further variations, the communication between the host device 3 and the data storage device 7 is, at least in part, encrypted. For example, the unique user identifier 15 sent between the host device 3, host driver instance 5, and the data storage device 7 can be encrypted. Similarly, sending the authentication credential 11, 13 between the host device 3, host driver instance 5, and the data storage device 7 can be encrypted. In some examples, this includes the host drive instance 5 negotiating a symmetric key with the data storage device 7. This can include using Diffie-Hellman key exchange. Thus the host driver instance 5 can encrypt the authentication credential 11, 13 using a symmetric key algorithm (e.g. Advanced Encryption Standard) and then send the encrypted authentication credential 11, 13 to the data storage device. The unique user identifier 15 sent between the data storage device 7 and host driver instance 5 can be similarly encrypted.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for selectively enabling access to stored user data files, the computer-implemented method comprising:
   physically connecting a data storage device to a host device, wherein:
      the host device includes a host device driver configured to interface with the data storage device for access to a storage medium of the data storage device; and
      the data storage device is configured to removably connect to a plurality of host devices through corresponding instances of the host device driver;
   receiving an authentication credential from the host device driver, wherein the authentication credential is associated with a user of the data storage device;
   retrieving a unique user identifier that is associated with the authentication credential; and
   enumerating, by the host device driver and to an operating system of the host device, a directory of stored user data files that are associated with the user, wherein:
      the data storage device is configured to store on the storage medium:
         a plurality of stored user data files that are associated with a plurality of users of the data storage device; and
         metadata, associated with each stored user data file of the plurality of stored user data files, comprising:
            a respective data file identifier; and
            at least one unique user identifier for at least one user of the plurality of users;
      the plurality of stored user data files is distributed on the storage medium without reference to partitions allocated to specific users of the plurality of users; and
      enumerating the directory comprises:
         sending, by the data storage device and to the host device driver, the metadata for each stored user data file of the plurality of stored user data files;
         comparing, by the host device driver and for each of the stored user data files, the unique user identifier to the at least one unique user identifier in the metadata for that stored user data file;
         including, for each stored user data file having the unique user identifier in the metadata of that file, a reference for that stored user data file in the directory; and
         providing the references for the included stored user data files to the operating system of the host device as the directory of the data storage device.

2. The computer-implemented method according to claim 1, wherein, in a user registration mode, the method further comprises:
   receiving a user creation request including the authentication credential of the user;
   generating the unique user identifier associated with the authentication credential; and
   storing, in a user lookup data structure in the storage medium of the data storage device, the unique user identifier with the associated authentication credential.

3. The computer-implemented method according to claim 1, further comprising:
   responsive to retrieving the unique user identifier that is associated with the authentication credential, sending the unique user identifier to the host device driver.

4. The computer-implemented method according to claim 3, wherein enumerating the directory is performed, in part, by the data storage device.

5. The computer-implemented method according to claim 3, further comprising:
   receiving, from the host device, a request to write a new user data file to be stored in the data storage device;
   adding, by the host device driver, the unique user identifier to a data file identifier associated with the new user data file; and
   writing the new user data file and the data file identifier associated with the new user data file to the storage medium of the data storage device.

6. The computer-implemented method according to claim 1, wherein:
   the authentication credential comprises a username and a password; and
   retrieving a unique user identifier that is associated with the authentication credential comprises querying a user lookup data structure in the storage medium of the data storage device for a unique user identifier associated with the username and the password.

7. The computer-implemented method according to claim 6, further comprising:
   verifying that the username and the password match records in the user lookup data structure in the storage medium of the data storage device, wherein enumerating the directory is in response to verifying that the username and the password match records in the user lookup data structure in the storage medium of the data storage device.

8. The computer-implemented method according to claim 7, further comprising:
   receiving, from the host device, a request to read one or more of the stored user data files for which the unique user identifier and the unique user identifier in the metadata for that stored user data file are matched; and
   responsive to receiving the request to read one or more of the stored user data files and verifying the username and the password, sending the one or more stored user data files associated with the request to the host device.

9. The computer-implemented method according to claim 7, further comprising:
   receiving, from the host device, a request to remove a user associated with the data storage device, and
   responsive to receiving the request to remove a user and verifying a username and a password:
      deleting stored user data files for which the unique user identifier in the metadata for that stored user data file matches the unique user identifier; and
      deleting the unique user identifier, the username, and the password associated with the user from the user lookup data structure in the storage medium.

10. The computer-implemented method according to claim 7, further comprising:
    updating an authentication status based on results of querying the user lookup data structure for a unique user identifier; and
    sending the authentication status to the host device driver.

11. The computer-implemented method according to claim 1, further comprising:
receiving, from the host device, a request to write a new user data file to be stored in the data storage device;
adding, by the data storage device, the unique user identifier to a data file identifier associated with the new user data file; and
writing the new user data file and the data file identifier associated with the new user data file to a storage medium of the data storage device.

12. A data storage device comprising:
at least one communication interface configured for wireless communication to a host device that is physically co-located with the data storage device, wherein:
the host device includes a host device driver configured to interface with the data storage device through the at least one communication interface; and
the data storage device is configured to sequentially connect to a plurality of host devices through corresponding instances of the host device driver;
at least one storage medium configured to store:
a plurality of user data files that are associated with at least one user of a plurality of users, wherein the plurality of user data files is distributed on the at least one storage medium without reference to partitions allocated to specific users of the plurality of users; and
metadata, associated with each stored user data file of the plurality of user data files, comprising:
a respective data file identifier; and
at least one unique user identifier for at least one user of the plurality of users; and
at least one controller configured to:
receive an authentication credential of a user from the host device driver;
retrieve a unique user identifier associated with the received authentication credential of the user; and
responsive to receiving the authentication credential of the user from the host device driver, enumerate a directory of stored user data files that are associated with the user, wherein enumerating the directory comprises:
receiving, from the at least one storage medium, the metadata for each stored user data file of the plurality of stored user data files;
comparing, for each of the stored user data files, the unique user identifier to the at least one unique user identifier in the metadata for that stored user data file;
including, for each stored user data file having the unique user identifier in the metadata of that file, a reference for that stored user data file in the directory; and
providing the references for the included stored user data files to the host device driver to enumerate, to an operating system of the host device, the directory for the data storage device.

13. The data storage device according to claim 12, wherein, in a registration mode, the at least one controller is configured to:
receive a user creation request including the authentication credential of the user;
generate the unique user identifier associated with the authentication credential; and
store, in a user lookup data structure on the at least one storage medium, the unique user identifier with the associated authentication credential.

14. The data storage device according to claim 12, wherein enumerating the directory further comprises making, by the host device driver, the directory from the references for the included stored user data files.

15. The data storage device according to claim 12, wherein the at least one controller is further configured to:
receive, from the host device, a request to read one or more stored user data files; and
responsive to receiving the request to read one or more of the stored user data files:
compare the unique user identifier of the user with the respective data file identifiers of the one or more stored user data files associated with the request; and
send the one or more stored user data files associated with the request to the host device for which the respective data file identifiers are matched with the unique user identifier of the user.

16. The data storage device according to claim 12, wherein the at least one controller is further configured to:
receive, from the host device, a request to remove a user associated with the data storage device;
verify that the authentication credential matches records in a user lookup data structure; and
responsive to receiving the request to remove a user and verifying that the authentication credential matches the records:
delete stored user data files for which the respective data file identifier matches the unique user identifier; and
delete the unique user identifier and the authentication credential associated with the user from the user lookup data structure in the storage medium.

17. The data storage device according to claim 12, wherein the at least one controller is further configured to, responsive to retrieving the unique user identifier that is associated with the authentication credential, send the unique user identifier to the host device driver.

18. The data storage device according to claim 12, wherein the at least one controller is further configured to:
receive, from the host device, a request to write a new user data file to be stored in the at least one storage medium, wherein the request includes at least one unique user identifier added by the host device driver to a data file identifier associated with the new user data file; and
write the new user data file and the data file identifier associated with the new user data file to the at least one storage medium of the data storage device.

19. A non-transitory computer-readable storage medium that has computer-readable program code stored therein that, when executed by a processor, causes a computer system to instantiate a host driver instance at a host device, wherein the host driver instance comprises:
means for connecting to a data storage device that is co-located with the host device, wherein:
the host driver instance is configured to interface with the data storage device over the connection; and
the data storage device is configured to sequentially connect to a plurality of host devices through corresponding host driver instances;
means for sending an authentication credential of a user to the data storage device configured to store user data files for a plurality of users on a storage medium of the data storage device;
means for receiving a unique user identifier, from the data storage device, that is associated with the authentication credential of the user;

means for receiving, from the data storage device, a plurality of data file identifiers corresponding to a plurality of stored user data files that are stored in the data storage device for the plurality of users, wherein:
- each data file identifier of the plurality of data file identifiers comprises at least one unique user identifier for a user associated with that stored user data file; and
- the plurality of stored user data files is distributed on the storage medium of the data storage device without reference to partitions allocated to specific users of the plurality of users; and means for enumerating a directory of stored user data files that are associated with the user, wherein enumerating the directory comprises:
- comparing, by the host driver instance and for each data file identifier of the plurality of data file identifiers, the unique user identifier to the at least one unique user identifier in that data file identifier;
- including, for each stored user data file having the unique user identifier in the data file identifier, a reference for that stored user data file in the directory; and
- providing the directory for the data storage device from the host driver instance to an operating system of the host device.

20. The non-transitory computer-readable storage medium according to claim 19, wherein the host driver instance further comprises:
- means for receiving, from the host device, a request to write a new user data file to be stored in the data storage device;
- means for adding, by the host driver instance, the unique user identifier to a data file identifier associated with the new user data file; and
- means for writing the new user data file and the data file identifier associated with the new user data file to the storage medium of the data storage device.

* * * * *